United States Patent [19]

Pepper, Jr.

[11] 4,371,746

[45] Feb. 1, 1983

[54] EDGE TERMINATIONS FOR IMPEDANCE PLANES

[75] Inventor: William Pepper, Jr., Bethesda, Md.

[73] Assignee: Peptek, Incorporated, Bethesda, Md.

[21] Appl. No.: 120,605

[22] Filed: Feb. 12, 1980

Related U.S. Application Data

[63] Continuation-in-part of Ser. No. 867,256, Jan. 5, 1978, Pat. No. 4,198,539, which is a continuation-in-part of Ser. No. 759,931, Jan. 17, 1977, abandoned, which is a continuation-in-part of Ser. No. 14,450, Feb. 23, 1979, Pat. No. 4,293,734.

[51] Int. Cl.³ .............................................. G08C 21/00
[52] U.S. Cl. .............................................................. 178/18
[58] Field of Search ............................. 178/18, 19, 20; 340/146.3 SY, 365 S, 365 C, 365 A, 365 R

[56] References Cited

U.S. PATENT DOCUMENTS

| | | | |
|---|---|---|---|
| 4,079,194 | 3/1978 | Kley | 178/18 |
| 4,080,515 | 3/1978 | Anderson | 178/19 |
| 4,178,481 | 12/1979 | Kley | 178/18 |
| 4,198,539 | 4/1980 | Pepper | 178/18 |
| 4,214,122 | 7/1980 | Kley | 178/18 |
| 4,293,734 | 10/1981 | Pepper | 178/19 |

*Primary Examiner*—Thomas A. Robinson
*Attorney, Agent, or Firm*—Jim Zegeer

[57] ABSTRACT

Edge terminations for polygonal impedance or resistance surfaces provide linearization of current flow to and/or from the surface through electrical connections at the vertices of the polygon. The edge terminations are constituted by a series of parallel ranks or rows of connective segments overlaid, inlaid or printed at each edge of the polygonal surface with the innermost row or rank being short straight segments and the length of each segment of the next innermost row, respectively, being longer. The central segment in each row or rank is electrically interconnected with the central segments in the other rows. A guard plane of conductive metal insulated from the impedance or resistance surface is also provided.

9 Claims, 3 Drawing Figures

U.S. Patent  Feb. 1, 1983  4,371,746
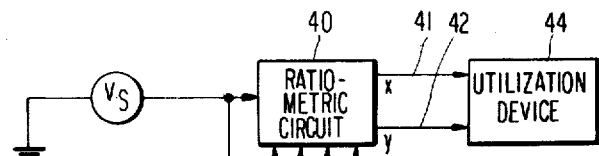
FIG 1a
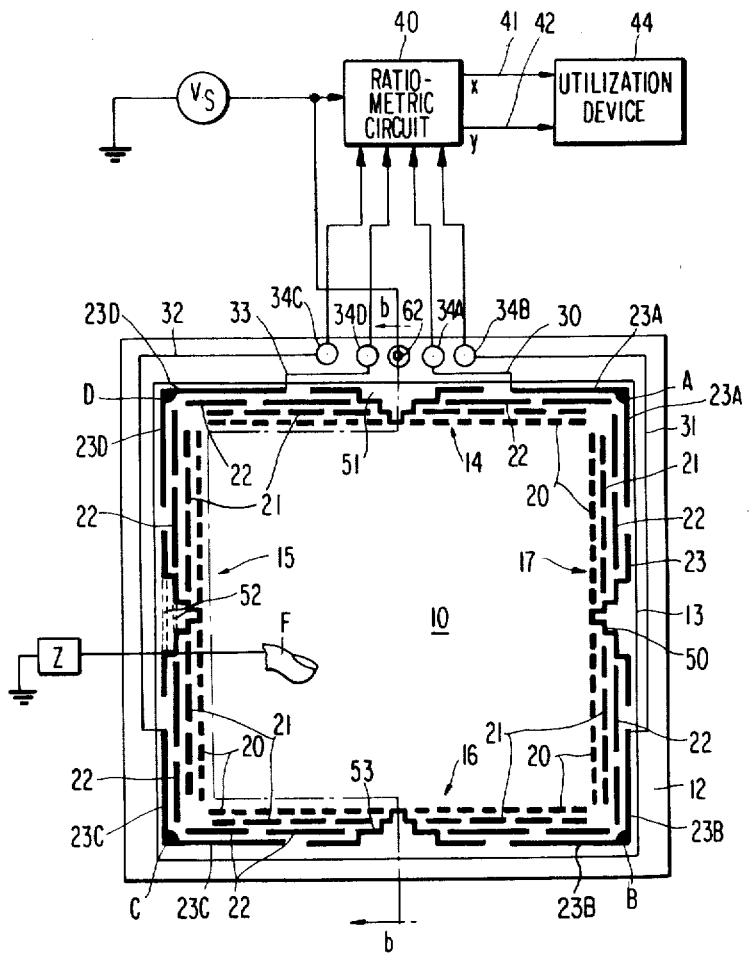
FIG 1b
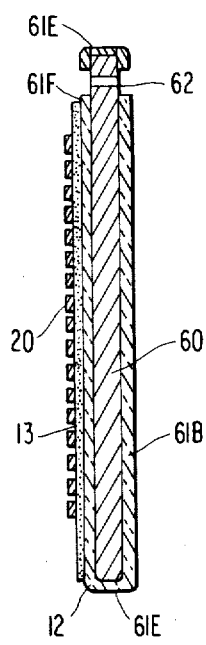
FIG 2
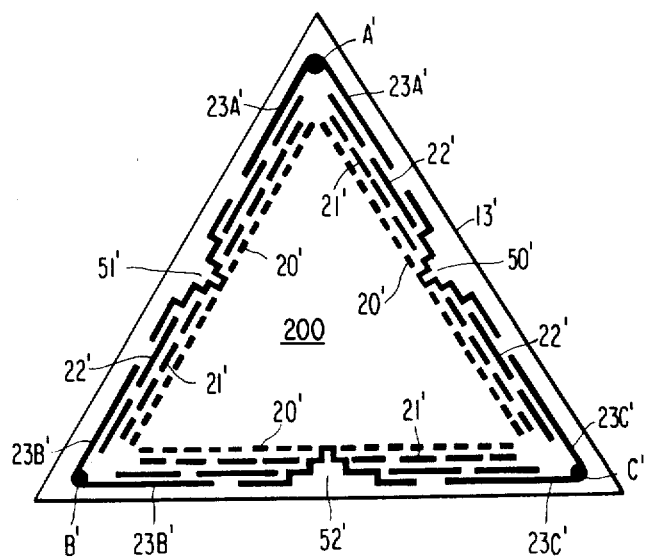

EDGE TERMINATIONS FOR IMPEDANCE PLANES

REFERENCE TO RELATED APPLICATIONS

This application is a continuation-in-part of my application Ser. No. 867,256 filed Jan. 5, 1978, now U.S. Pat. No. 4,198,539, which, in turn, is a continuation-in-part of my application Ser. No. 759,931 filed Jan. 17, 1977, now abandoned, and my application Ser. No. 014,450 filed Feb. 23, 1979, now U.S. Pat. No. 4,239,734, which patents are incorporated herein by reference.

BRIEF DESCRIPTION OF THE INVENTION

The invention relates to edge terminations for impedance or resistance planes or surfaces, as used, for example, in touch panels, and more particularly to linearizing edge terminations for such polygonal impedance surfaces. The term linearizing, as used here, means that a uniform current density can be produced throughout a surface of uniform resistivity by connecting appropriate voltages to the edge terminations. I have discovered as revealed in my U.S. Pat. No. 4,293,734, that a resistive surface thusly linearized has the additional property that the location on said surface of a source of sink of electric current can be determined from measurements of the fraction of said current flowing through each connection to the edge terminations. A series of parallel ranks or rows of conductive segments are overlaid, inlaid and/or printed parallel to each edge of the polygonal surface, with each successive rank from the next most outer rank or row of conductive segments to the innermost rank or row of conductive segments being progressively shorter with the innermost row being constituted by short segments of equal length and, in the preferred embodiment, of an odd number. The central conductive segment in the innermost row is electrically connected with the center-most segment in the next succeeding row and so on to the outer-most row. The longer segments of the outer row bridge the gaps between the shorter segments of the row proceding it, and so on to the innermost row. This geometry is such that the resistivity of the plane can be changed without affecting the linearization of current flow, and the scale of the pattern can be expanded or contracted to accommodate any size surface that may be desired.

For use in touch panels of the kind described in my U.S. Pat. No. 4,293,734, a guard layer of conductive material may also be placed beneath, or partially surrounding, the resistive touch surface and insulated from it. By energizing this guard layer with a signal of the same amplitude and phase as the signal applied to the edge terminations, the effective capacitance to ground of the resistive touch surface can be substantially reduced. This has the practical advantage that circuit means for cancelling the effect of the capacitance to ground, as described in my U.S. Pat. No. 4,293,734, can be simplified or eliminated.

BRIEF DESCRIPTION OF THE DRAWINGS

The above and other features and advantages of the invention will become more apparent in view of the following specification when taken in conjunction with the accompanying drawings wherein:

FIG. 1a is a top plan view of a polygonal touch panel surface incorporating the invention and having a block diagram of the electrical circuit illustrated in my U.S. Pat. No. 4,293,734 for "Touch Panel System And Method"; and FIG. 1b is a section through lines b—b of FIG. 1a, which is greatly enlarged in the thickness direction of the components parts for purposes of illustration, and FIG. 2 is a top plan view of a triangularly shaped touch panel surface incorporating the invention.

DETAILED DESCRIPTION OF THE INVENTION

The touch panel or tablet 10 of the present invention is constituted by an insulating substrate 12 on which is applied a layer of resistive material. In this embodiment, the resistive material 13 is in the form of a rectangle or square having four sides 14, 15, 16 and 17 each having formed therein edge terminations according to the invention. Edge terminations of the four sides are identical and are constituted by four rows or ranks of straight conductive segments: conductive segments 20 constituting the innermost row or rank, there being an odd number (seventeen) in this embodiment of equal length conductive segments, next innermost row of conductive segments 21, there being an odd number of these segments (nine), the next innermost row or rank of segments 22, five in number, which are longer than the innermost rows 20 and 21 and, finally, the outermost rows 23, again having an odd number (three), of conductive segments (there obviously can be more rows as desired). The corner segments 23A of each adjacent outer row are connected together (they are screen printed or otherwise formed as a single conductor element) to form corner connections A, B, C and D respectively as shown in FIG. 1a, and these corner connections or connectors are connected by conductive paths 30, 31, 32, and 33 to conductive eyelets 34A, 34B, 34C and 34D (which are insulated from guard plane 60 by porcelain layers 61F and 61B) to which electrical connections are made to the external circuitry shown in block diagram in FIG. 1a.

As is shown in FIG. 1a, the four corners A, B, C and D are electrically connected to a ratiometric circuit 40 and are energized by a signal generator Vs, one side of which is connected to ground. When the surface of resistance plane 13 is touched by a user's finger F current flows through the user's body (denoted by a lumped impedance Z) to ground and is the current flowing through corners A, B, C and D. Output signals from the ratiometric circuit 40 include a pair of outputs 41 and 42 which are the X and Y coordinates of position, respectively, of a touch point on the panel or tablet surface. These signals are applied to a utilization device 44 along with other signals (such as a presence or absence signal, force or pressure signals from transducers (not shown)) all as more fully disclosed and described in my U.S. Pat. No. 4,293,734.

As further shown in FIG. 1a, each row or rank has an odd number (not even) of conductive segments therein and the central conductive segments in each row or rank are electrically connected together as shown at 50, 51, 52 and 53. In this case, to reduce the amount of conductive material the center portions indicated by the dotted lines at 52 have been omitted since the resistance of the conductive metal segments is essentially zero for the length of conductor involved and the central conductive segment of the innermost row is effectively common to each succeeding row or rank. It will be particularly noted that the geometry of the pattern is such that the ends of the shorter segments are bridged by the longer segments and vice-versa.

While the conductive paths 31-34 for connecting the corners to their respective eyelets are shown as being off of the resistive surface 13, the current flow to and from the eyelets is not in any way affected since it is a direct conductive path from the long corner conductive segments.

The triangular configuration of conductive segments illustrated in FIG. 2 has three corners but it will be noted that the geometric pattern at each of the edges as shown in FIG. 2 is essentially identical to the pattern shown in FIG. 1. However, by the use of a ratiometric circuit the precise position of a point on the surface 200 of the triangular panel shown in FIG. 2 can be accurately determined as disclosed in my application Ser. No. 014,450. By use of the straight conductive segment approach and the interconnection of the central-most segments as illustrated, the current distribution in and to the touch panel surfaces per se is linearized. In addition, the absolute resistivity of the touch panel surface itself is of no particular moment and the device can be scaled up or down. That is to say, the pattern illustrated in FIG. 1a can be used for much larger and much smaller touch panel surfaces simply by projecting a larger or smaller pattern, respectively, of the edge terminations upon the desired size panel. Since the spacing between conductive segments is relatively large, minor printing imperfections do not significantly affect the linearization thus making manufacture easy.

Referring now to FIG. 1b, a metal plate 60 which is steel, but could be aluminum or any conductive metal, is coated over substantially the entire surface thereof with a fused-on porcelain layer 61f and 61b for the front and back surfaces as well as on the ends 61e. An opening or eyelet 62 is provided through the porcelain layer 61 to the bare metal surface of plate 60 and as shown in FIG. 1a, an electrical connection is made to the voltage source Vs. which is the same voltage used to energize the panel as disclosed in my U.S. Pat. No. 4,293,734 and this will practically eliminate the capacitance to ground problems of the resistance surface 10. It will be appreciated that instead of being formed on a conductive metal plate an epoxy and glass circuit board, phenolic board or the like having aluminum foil or copper thereon could be used to provide the guard plane. However, it is to be clearly understood that the invention is not limited to the presence or absence of such guard plane and that the guard plane may be used in other touch panel arrangements not requiring the edge terminations of the present invention.

The layer or coating of material forming the resistance plane 13 is constituted by a resistance material such as carbon (so the surface 10 actually has the appearance of a black surface) carried in a glass or enamel frit to constitute a conductive glass frit which is well known in the art. After the glass frit has been heated to fuse the glass into a stable layer on the front porcelain surface 61F, it has screened or otherwise applied, inlaid, underlaid or overlaid at the edges a conductive silver ink in the pattern described above which is applied and cured to thereby complete the panel assembly. Mounting holes (not shown) are provided at the corners. Insulating studs may be used at the apertures for the output or conductive eyelets and 34A, 34B, 34C and 34D may be used to support the panel. However, it is preferred that the holes for the supporting of the plate be provided at the four corners as to rigidly support the panel.

Alternatively, the conductive eyelets 34A, 34B, 34C and 34D can be positioned at the corners or any place else that may be desired (the porcelain layer passes through the eyelets so that they may be silvered without contacting the metal plate 60 constituting the guard plane. Alternatively, the conductive lines 30, 31, 32 and 33 may extend to the edge of the assembly and be used much in the manner of printed circuit board edge connectors. Instead of using a metal plate as a substrate, a transparent touch panel can be formed on a transparent substrate such as glass or plastic. The guard plane can be a transparent conductive layer such as tin oxide on one side of a thin glass substrate and the resistance surface can be a transparent resistive coating also formed of tin oxide but on the opposite surface from the guard plane.

While the invention has been described in terms of a resistance plane being in the form of carbon granules or other resistance material in a glass frit carrier and the conductive pattern screened, inlaid or printed thereon, it will be appreciated that the conductor pattern can be formed on the substrate carrier base and the resistive material applied thereover. The pattern of conductor segments can be formed from copper or aluminum foil on a fiber glass laminate and the copper or aluminum etched away to leave the conductive conductor segments in the pattern shown. Furthermore, the resistance plane can be a polymer ink with conductive materials incorporated therein, a paint pigmented with resistive material. It is also apparent that the conductive segments as well as the resistance layer can be vacuum-deposited using well-known sputtering techniques. It is intended that these as well as other modifications and adaptations of the invention as will become apparent to those skilled in the art be emcompassed within the spirit and scope of the claims appended hereto.

I claim:

1. In a polygonal impedance surface for converting physical position information on said impedance surface to electrical signals, improvement in edge terminations for said polygonal surface comprising;
   a plurality of parallel rows of conductive segments on each edge, respectively, of said polygonal impedance surface, with at least one outermost row conductor segment of adjacent edges being conductively connected together, and a connector terminal for connecting said at least one outermost row conductor of adjacent edges to an external electrical circuit.

2. The invention defined in claim 1 including conductor means electrically interconnecting the central ones of said conductive segments in each row.

3. The invention defined in claim 1 wherein there are an odd number of conductive segments in each row and the central conductive segment of at least two rows are electrically interconnected.

4. The invention defined in claim 1 wherein the centermost conductive segment of the innermost row is electrically common to the central one of the outermost row of conductive segments and is electrically common to each central conductive segments of the row therebetween.

5. The invention defined in claim 1 including a conductive layer, an insulating layer on said conductive layer, said polygonal impedance surface layer being formed on the surface of said insulating layer opposite said conductive layer, and means for connecting said conductive layer to a source of voltage.

6. The invention defined in claim 1 wherein each edge of said polygon is equal in length to all other edges thereof.

7. The invention defined in claim 1 wherein said conductor elements are applied by a silk screen process with a silver-filled ink.

8. A method of modifying the resistance characteristics of the boundary sections of a thin layer of resistance material of a touch panel device having a polygonal geometrical perimetrical configuration, comprising applying a plurality of rows of straight conductor elements to the surface of each said boundary section, said rows of straight conductor elements being in a geometrical pattern such as to linearize current flow to and/or from said touch panel via said boundary sections to electrical terminals.

9. In a touch panel system having an impedance layer forming a touchable surface, the improvement comprising a conductive layer forming a guard plane which has an area at least as great as the area of said impedance layer and being spaced therefrom by an insulating layer, and means for connecting said conductive layer to an electrical potential in said system.

* * * * *